United States Patent [19]

Best et al.

[11] Patent Number: 4,616,394

[45] Date of Patent: Oct. 14, 1986

[54] METHOD OF LOCK CAPPING

[75] Inventors: Walter E. Best; William R. Foshee, both of Indianapolis, Ind.

[73] Assignee: Best Lock Corporation, Indianapolis, Ind.

[21] Appl. No.: 733,102

[22] Filed: May 13, 1985

Related U.S. Application Data

[62] Division of Ser. No. 471,277, Mar. 2, 1983, Pat. No. 4,531,390.

[51] Int. Cl.⁴ ........................ B23P 11/00; B23P 11/02

[52] U.S. Cl. ........................................ 29/436; 29/453

[58] Field of Search ................ 29/453, 446, 434, 436; 70/DIG. 15, 372, 373, 364 A

[56] References Cited

U.S. PATENT DOCUMENTS

| | | | |
|---|---|---|---|
| 2,105,659 | 1/1938 | Jacobi | 70/373 X |
| 2,366,456 | 1/1945 | Pheazey | 29/453 X |
| 2,621,088 | 12/1952 | Cole | 29/453 X |
| 3,002,268 | 10/1961 | Spain | 70/372 X |
| 4,047,407 | 9/1977 | Aranzabal | 70/372 X |
| 4,380,163 | 4/1983 | Reder | 70/364 A |
| 4,407,055 | 10/1983 | Rossberg | 29/453 X |

*Primary Examiner*—Charlie T. Moon

*Attorney, Agent, or Firm*—Barnes & Thornburg

[57] ABSTRACT

A utility cylindrical lock set having a series of pin tumbler bores accommodating a plurality of pin stacks and biasing springs is provided with an improved cap. The external surface of a cylindrical lock body includes a cap-receiving groove crossing the open upper ends of the pin tumbler bores. The sides of the groove are undercut to form overlying flanges. An elongated cap having a central portion to overlie the pin tumbler bores and edge portions offset downward from the central portion is receivable within the groove. The edge portions of the cap project oppositely outward to engage the side flanges of the groove to retain the cap in place in the groove. A small recess is formed in one side of the groove. The elongated cap includes a complementary side protrusion to engage the recess to locate the cap against longitudinal movement in the groove. The cap is mounted by engaging one edge of the transversely yieldable cap beneath one side flange and then applying force to the opposite edge to pass the opposite flange and move downward to a position of engagement beneath such flange.

5 Claims, 6 Drawing Figures

METHOD OF LOCK CAPPING

This is a division of application Ser. No. 471,277 filed Mar. 2, 1983, now U.S. Pat. No. 4,531,390.

This invention relates to a tumbler pin lock, more particularly to a utility lock cylinder of a small standard size which is adapted to be easily and repeatedly recombinated.

In many cases, it is desirable to combinate a utility lock cylinder in a lock system in which the other locks comprise key-removable cores and which can be recombinated by simply removing the existing cores and replacing them by differently combinated cores. Industry standard utility lock cylinders, and especially the standard openings and fittings provided on utility cabinets and the like, are too small to permit the use of standard key-removable cores, so that it has not been possible to utilize such key-removable cores in such small cabinet locks.

Moreover, the standard size utility lock cylinder provides insufficient space to conveniently combinate the lock over the full range of key bittings utilized in the key-removable cores. The length between the uppermost or zero-cut of the key bitting to the bottom of a conventional pressed-in cap at the top of the pin bore is inadequate to properly accommodate a desirable length of tumbler pins and their biasing spring. In a prior lock having such pressed-in caps, the tumbler pins may not move sufficiently to permit free insertion and removal of a key, and failures occur in which the movement of the tumbler pins and the compression of their biasing spring exerts sufficient force on a pressed-in cap to drive it out of the tumbler pin bore. Further, the use of conventional pressed-in caps to close the upper ends of the tumbler pin bores makes it difficult to recombinate the standard size utility lock cylinders in keeping with core changes of other locks of a system or particular portion of a lock system in which other locks comprise key-removable cores.

The present invention provides a utility lock cylinder of a standard size to fit standard openings and interact with standard fittings, in which the capping means substantially increases the length in the tumbler pin bores available for accommodating the pin stacks and their biasing springs. The capping means also permits ready removal and replacement of the cap so as to allow easy and repeated recombination of the lock.

In accordance with the invention a utility lock cylinder or the like comprises a generally cylindrical lock body adapted to fit a standard opening in a utility cabinet or the like. The body has a key plug bore extending longitudinally on an eccentric axis, and has a series of pin tumbler bores extending in a common plane from the key plug bore to an external surface at the opposite side of the body. Commonly, the external surface of a utility lock cylinder is threaded to receive a clamping nut for mounting the cylinder through a door or panel. In accordance with the present invention, the external surface of the body is formed with a cap-receiving groove crossing the open upper ends of the pin tumbler bores, and the sides of such groove are undercut so as to form overlying flanges or lips extending toward each other above the undercut sides. An elongated cap for reception in such groove has a central portion to overlie the pin tumbler bores and has edge portions offset downward from such central portion and projecting oppositely outward for engagement beneath the side flanges or lips of the groove to retain the cap in place in the groove. The cap is desirably formed of an elongated strip of sheet stock with its side edge portions bent downward and thence outward to form the downward offset and outward extending edge portions for engagement beneath the retaining flanges of the groove. Desirably, the groove is formed at at least one side and at a point intermediate its length with a small side recess, and the elongated cap is formed with a complementary side protrusion or detent which engages in the recess to locate the cap against longitudinal movement in the groove. The biasing springs in the pin tumbler barrels may have upper reduced ends smaller than the diameter of the pin bores, and the central portion of the cap may have a reduced width sufficient to receive such reduced ends of the springs and leave wider edge material to be bent downward at the sides of such reduced ends and thence outward to provide the offset edge portions. The groove and cap can thus be made narrower than would otherwise be required.

The downward offset is desirably sufficient to dispose the central portion substantially at the outermost position which will clear the threads of the clamping nut. The offset also has the effect of making the cap resiliently yieldable transversely to a degree sufficient to enable the cap to be mounted by engaging one edge of the cap beneath one side flange and then applying force to the opposite side of the cap to resiliently reduce its width and permit the opposite edge to pass the opposite flange and move downward to a position of engagement beneath such flange.

The accompanying drawings illustrate the invention and show an embodiment exemplifying the best mode of carrying out the invention as presently perceived. In such drawings.

Figure 1:
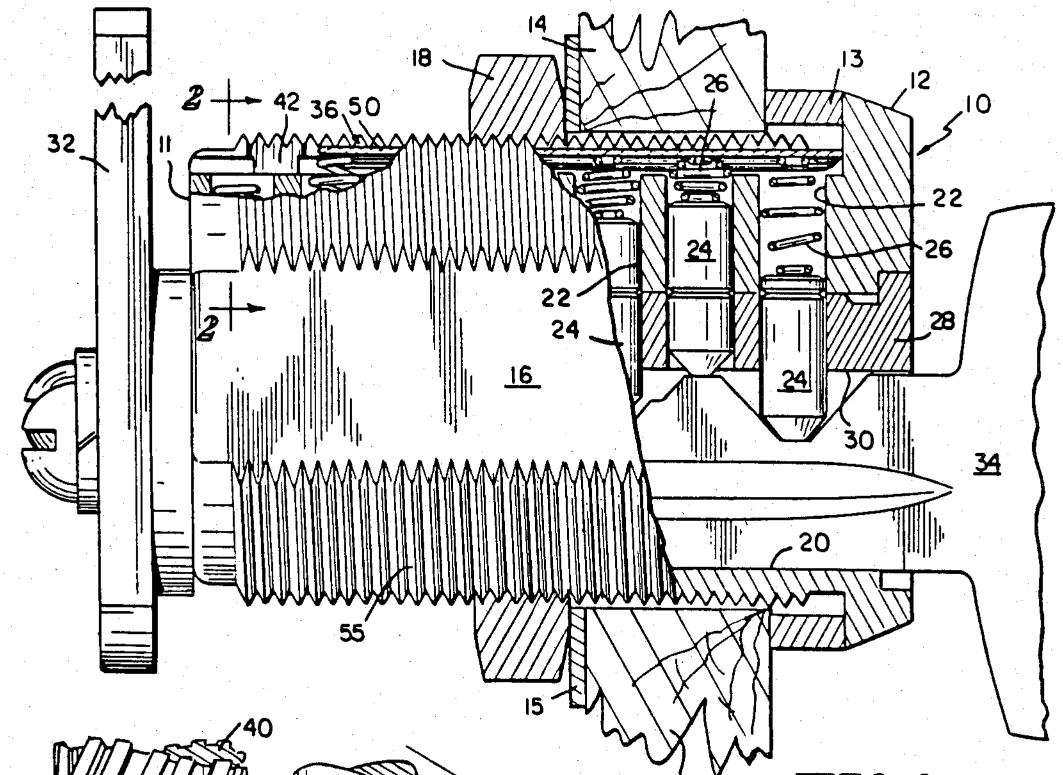
FIG. 1 is a vertical longitudinal section of a utility lock cylinder embodying the present invention; .

The utility lock cylinder shown in FIGS. 1–5 comprises a generally cylindrical lock body 10 having a radial flange 12 at its front end to position the lock body axially with respect to a door panel 14, drawer front, or the like. The body is threaded to receive a clamp nut 18 for clamping the lock in place. The cylinder may be mounted with a spacer ring 13 between the flange 12 and panel 14, a lock washer 15 being placed between the clamping nut 18 and the panel 14. Rearward of the flange, the body is formed with two flat sides 16 to prevent its rotation when mounted in an opening of corresponding shape. The body 10 has a key plug bore 20 extending longitudinally on an eccentric axis below the center line of the body, and has a series of pin tumbler bores 22 for the reception of stacks of tumbler pins 24 and their biasing springs 26. Such bores extend into a key plug 28 mounted in the key plug bore and provided with a key slot 30. The rear of the key plug 28 carries an operating cam 32 which rotates with the key plug 28 when such plug is operated by a key 34. To permit such rotation of the key plug, the key is cut to actuate the stacks of tumbler pins to a position in which a break point between pins in each stack is aligned with the interface or shear line between the outside surface of the key plug 28 and the inside surface of the key plug bore 20. In the lock as shown in FIG. 1, the front stack of tumbler pins has its single break point at the uppermost combinating point used in combinating the lock, and the next adjacent pin stack has its break point at the lowermost point used in combinating the lock. The key is cut accordingly, with its deepest cut at the front and its shallowest cut at the next pin stack. Accordingly, the spring 26 in the front tumbler pin bore 22 is nearly fully extended, and the spring 26 is substantially fully compressed, so that the two springs indicate the range of extension and compression, and especially the degree of compression, of the biasing springs in the operation of the lock.

Figure 2:
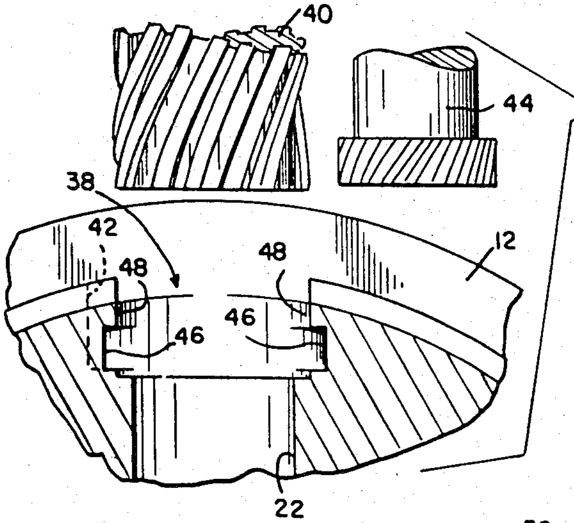
FIG. 2 is a partial section taken on the line 2—2 of FIG. 1 showing the lock body in exploded relation with milling cutters for forming the cap-receiving groove.
Figure 5:
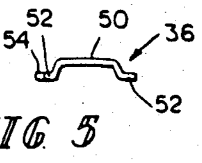
FIG. 5 is an end view of the cap showing its cross-sectional shape.
Figure 4:
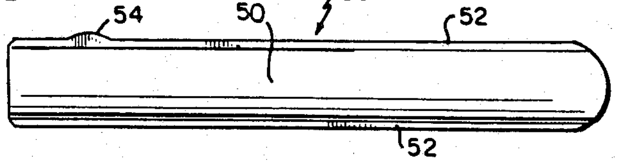
FIG. 4 is a top plan of a cap for reception in such groove.
Figure 3:
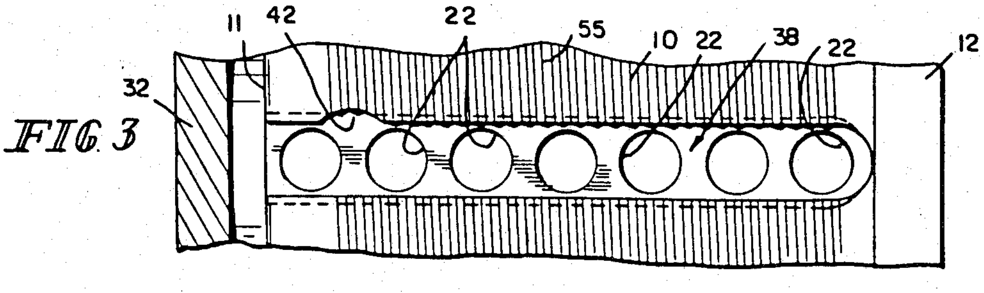
FIG. 3 is a top plan view of the lock body, with the cap-receiving groove empty.

In accordance with the present invention, the outer ends of the pin tumbler bores 22 are closed, and the springs held in the bores, by a specially shaped cap 36 received in a specially shaped groove 38 formed in the lock body 10 adjacent its top surface. As shown in FIGS. 2 and 3, the groove 38 is a straight groove extending from the rear face 11 of the lock body 10 forward to the front flange 12. The basic groove is conveniently cut with a milling cutter 40 which may make a single pass lengthwise of the groove. At one point in that pass, the milling cutter is moved laterally a short distance to cut a recess 42 in one side of the groove 38, preferably near the rear end of the body. The sides of the groove are then undercut, as with a milling cutter 44, to form undercuts 46 in the sides of the groove and to leave overhanging flanges or lips 48 extending toward each other above the undercuts of the sides.

The cap 36 used in such groove is an elongated strip formed with a central portion 50 to overlie the pin tumbler bores 22 and with edge portions 52 offset downward from such central portion and projecting oppositely outward for engagement beneath the side flanges or lips 48 of the groove to retain the cap in place in the groove. The cap is desirably formed of an elongated strip of sheet stock with its side edge portions bent downward and thence outward to form the downward offset and outward extending edge portions 52. When the groove is formed with a side recess 42, the elongated cap is formed with a complementary side protrusion or detent 54 for engagement in the recess 42 to locate the cap against longitudinal movement in the groove. The biasing springs in the pin tumbler barrels may have upper ends which are reduced to a diameter smaller than the diameter of the pin bores, and this has the advantage that the turns of the spring can telescope one within the other to permit the spring to collapse to a greater extent than would otherwise be the case. With such springs, which may be referred to as barrel-shaped springs, the central portion 50 of the cap may be of a width sufficient to receive the reduced upper ends of the springs and to leave side portions available for the bends required to offset the edge portions 52. This permits the groove and cap to be made somewhat narrower than might otherwise be required.

Figure 6:
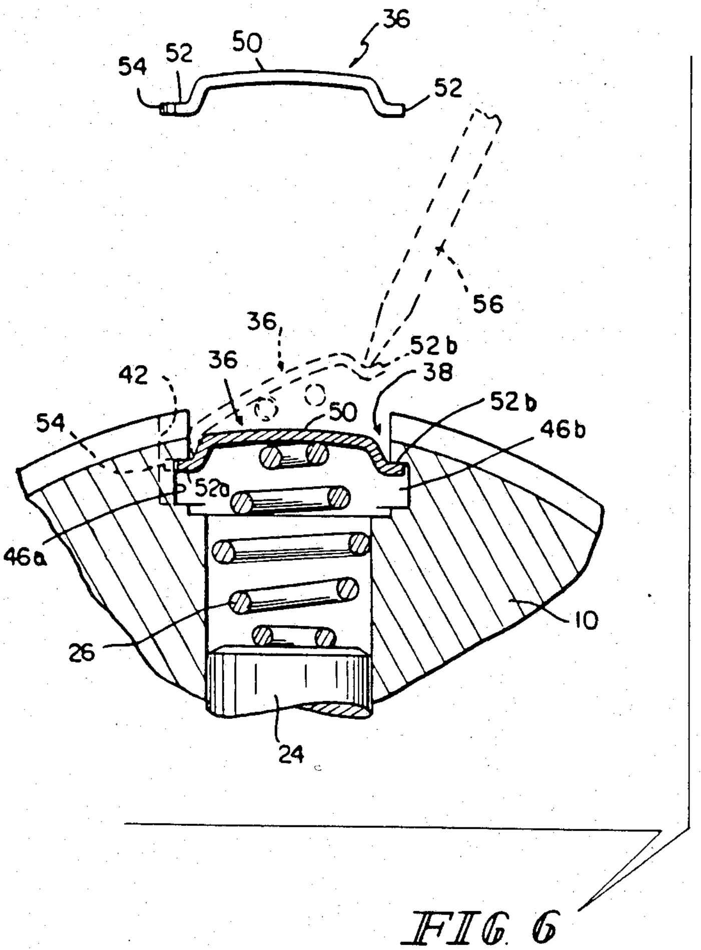
FIG. 6 is a diagram showing a method of applying a cap in accordance with the present invention.

As shown in enlarged section in FIG. 6, the cross section of the cap is such that the central portion 50 has its bottom surface well above the top surfaces of the side portions 52, and hence well above the upper edges of the undercuts 46 of the groove. This permits the flanges or lips 48 to be of substantial thickness, yet disposes such central portion substantially at the root diameter of the threads 55 on the lock body 10. The central portion 50 of the cap is desirably arched on an arc corresponding to that of the threads of the nut 18 and can be located at an extreme outward position with little or no clearance from such threads. Any minor interference between the nut threads and the cap presents no serious problem since the cap is held outward by the biasing springs 26 and can yieldably retract to pass the nut if such interference occurs.

The cross-sectional shape of the cap 36, with its offset edges and arched central portion, also provides that the cap is resiliently yieldable transversely of the groove, and this enables the cap to be mounted in the manner represented by the diagram of FIG. 6. In the mounting operation, one edge 52*a* of the cap 36, preferably the edge which carries the detent 54, is inserted in the undercut 46*a*, with the detent 54 engaged in the recess 42. The cap is pressed downward manually against the biasing springs 26 and with a tool 56, and the tool 56 is then used to apply force transversely of the cap so as to cause the cap to resiliently yield and allow the edge 52*b* to pass through the upper narrow portion of the groove, between the flanges or lips 48, and into the undercut 46*b*.

This method of mounting an elongated cap over a series of tumbler pin bores is of substantial advantage. While elongated caps have been previously mounted in grooves, it has been necessary either to slide the cap lengthwise into a previously formed groove, or to form the groove by staking the edged thereof after the cap is in place. Such prior caps have not included the downward offset edges nor the transverse resilient yieldability.

Removal of the cap 36 may be accomplished by applying longitudinal force to the cap to disengage its detent 54 from the reces 42 and then to slide the cap longitudinally out of the groove. Alternatively, it is also feasible to apply lifting force with a hook-like tool to the central portion 50 of the cap so as to produce resilient bending of the cap and sufficient reduction of its width to permit a side edge of the cap to move out of the undercut in which it is engaged and to pass through the narrow upper portion of the groove 38.

The capping mechanism and method of the present invention, as exemplified in the embodiment shown in the drawings, provides a substantially increased length for the reception of the tumbler pin stacks in the pin bores. In a lock as shown in the drawings, the use of a cap as shown increased the available length by approximately ten percent (10%) in comparison with a similar lock previously made and capped with pressed-in individual caps. Such increased available length overcomes problems encountered with such previous lock, in that it allows greater movement of the tumbler pins so as to permit use of the full range of bitting used in desirable key-revmovable cores while avoiding problems previously encountered in differently capped cylinder locks of corresponding standard size. It thus eliminates excess pressure of the tumbler pins on the keys and consequent binding of the keys during insertion and removal, and avoids the failures such as occurred with the previous lock when the biasing springs 26 became so fully collapsed as to exert pressure on the pressed-in caps and cause them to escape. The capping means also provides the advantages of edgewise insertion of the cap in the lock body with the lock body fully combinated with tumbler pins and with biasing springs present in all of the tumbler pin bores of the body.

What is claimed is:

1. The method of capping a tumbler pin lock comprising forming a lock body with a series of tumbler pin bores and a groove crossing the outer ends of the bores and having undercuts in its sides, inserting tumbler pins with springs thereon into said tumbler pin bores, providing an elongated cap including opposite outward-presented edge portions which are resiliently retractable toward each other, engaging one such edge portion edgewise in the undercut at one side of the groove, and applying force to the opposite edge portion to yieldingly move such opposite edge portion into the undercut at the opposite side of the groove.

2. The method of claim 1 in which the cap is formed with a central portion to lie opposite the open ends of the tumbler pin bores and with edge portions which are offset from the plane of such central portion so that the cap is resiliently bendable transversely to permit the edges to retract toward each other.

3. The method of claim 2 which includes forming the groove with a side recess and the cap with a side detent for engagement in the recess, and in which the step of engaging one side edge portion of the cap in an undercut also engages the cap detent in the groove recess.

4. A method of capping a pin tumbler lock, the method comprising the steps of forming a lock body having a key plug bore, a plurality of pin tumbler bores extending therefrom, and a cap-receiving groove crossing the outer ends of the pin tumbler bores, said groove having undercut sides and overlying side flanges extending toward each other at the sides of the groove, inserting tumbler pins with springs thereon into said tumbler pin bores, providing a cap having a central portion and a pair of oppositely extending edge portions, each edge portion including a side member depending from the central portion to define a distal edge and an offset member extending outwardly from the distal edge of the side member, engaging the offset member of one of the edge portions in the undercut at one side of the groove, and applying force to the opposite edge portion to bend resiliently the central portion and move the offset member of such opposite edge portion into the undercut at the opposite side of the groove to retain the cap in place in the groove.

5. A method of capping a pin tumbler lock, the method comprising the steps of forming a lock body having a key plug bore, a plurality of pin tumbler bores extending therefrom to an exterior surface of the body, and a cap-receiving groove in said exterior surface and crossing said pin tumbler bores, said groove being substantially T-shaped so as to form two opposed lips overlying undercuts.

inserting tumbler pins with springs thereon into said tumbler pin bores, providing a cap having a hat-shaped cross-section including tabs and a central portion offset from the tabs in substantially spaced-apart parallel relation, engaging one of the tabs beneath one of the lips of the groove, and applying force to the cap to bend resiliently the central portion and move the other of the tabs into engagement beneath the other of the two opposed lips to retain the cap in the groove and the position the central portion in the groove to overlie and close the outer ends of the pin tumbler bores.

* * * * *